Nov. 23, 1948.   O. A. BRANDT ET AL   2,454,627
WHEEL OPERATING MEANS FOR AIRPLANES

Filed Nov. 27, 1944                    4 Sheets-Sheet 1

INVENTORS.
OTHO A. BRANDT.
FLORENCE G. ELLINGSEN
BY
ATTORNEY

INVENTORS
OTHO A. BRANDT.
FLORENCE G. ELLINGSEN
BY:
ATTORNEY

Nov. 23, 1948.   O. A. BRANDT ET AL   2,454,627
WHEEL OPERATING MEANS FOR AIRPLANES

Filed Nov. 27, 1944   4 Sheets-Sheet 3

INVENTORS
OTHO A. BRANDT
FLORENCE G. ELLINGSEN
BY:
ATTORNEY

Nov. 23, 1948.  O. A. BRANDT ET AL  2,454,627
WHEEL OPERATING MEANS FOR AIRPLANES
Filed Nov. 27, 1944  4 Sheets-Sheet 4

INVENTORS
OTTO A. BRANDT
FLORENCE G. ELLINGSEN
BY:
ATTORNEY

UNITED STATES PATENT OFFICE 2,454,627

WHEEL OPERATING MEANS FOR AIRPLANES

Otho A. Brandt, St. Paul, and Florence G. Ellingsen, Minneapolis, Minn.

Application November 27, 1944, Serial No. 565,270

2 Claims. (Cl. 244—103)

This invention relates to the improvement in wheel operating means for airplanes which rotates the landing wheels of the airplane so that when the wheels touch the ground, they are in rotating motion. The landing wheels of the airplane are operated by air, which provides a most economical means of setting the wheels of the airplane in motion, so that when the wheels contact the ground, they are rotated, and thus the ground friction against the tires is not directed with anywhere near the severity as where the tires and wheels are standing still. Thus, we provide a means of protecting the rubber landing tires of the airplanes, thereby increasing the life of the tires very materially.

It is a feature of our invention to provide means of economically setting the landing wheels of the airplane in motion. We accomplish this by placing a number of fins or projections on the hub, or on a plate attached to the hub of the landing wheels of the airplane. The air fins or vanes may be formed directly on the tires when they are molded so that when the air is directed against the fins, the wheel will be set in motion.

The air fins or vanes may be of any desired shape, size and formation to force the wheel to rotate and to gain momentum as the airplane passes through the air.

It will be apparent that our wheel operating means is particularly adapted to high speed airplanes. Thus, with our wheel operating means, the landing wheels may be rotated as fast as possible so that when contact with the ground is made, the wheels are already in motion. Thus, a minimum loss of rubber will occur as the wheels contact the ground.

It will also be apparent that if the airplane has a high landing speed, and the wheels are at a standstill when they contact the ground, the force of the impact with the ground will cause the tire to heat and the frictional contact will tear the rubber from the tire. We overcome this undesirable condition to the present construction of airplanes by providing a very economical means of operating the wheels whenever it is desired.

A further feature and advantage with our wheel operating means resides in eliminating weight and moving parts. There is no need of adjustments to be made with our wheel operating means after installation has been completed and there is no wearing of the parts or no mechanical failures.

A further feature of our invention resides in providing a means of rotating the landing wheels of the airplane while they are retracted in the plane body or wings so that the wheels may be operated as gyros. Thus, in the event of rough air, or for precision bombing, or for any other reason, where it is desirable to hold the plane steady in flight, the wheels are rotated to act as gyros and hold the plane steady while in the air. In providing this means of using the landing wheels as gyros in the airplane, a greater stability in flight is accomplished without virtually any addition in weight and without any mechanical parts being required.

We provide manually controlled beams for directing air to the respective wheels, so that when the air contacts the fins or vanes on the wheels, it will cause them to rotate while in retracted position.

It may be desirable for some types of airplanes to provide an air supercharger which will increase the force of air to the air vanes on the wheels so that increased speed of rotation may be accomplished if desired. With an air supercharger means (not illustrated in the drawings), the wheels may be set in rotation from a standing position and then by the natural flow of air over the airplane, they may be kept continually rotating. Thus, the air supercharger may act to supply a greater air force against the vanes of the wheels whenever it is desired.

With our operating means, it will be apparent, as hereinafter more fully set forth, that the wheels of the airplane may be rotated at any time and that rotation of the wheels may be stopped whenever desired by the use of the present brakes used in the retarding of the rotation of the wheels. Thus, should the operator of the airplane be using the wheels as gyros, and it is desirable to stop the rotation of the wheels, the brakes are applied and the wheels will come to rest. In this manner, the operator of the airplane has complete control at all times.

Furthermore, our wheel operating means is of primary importance, because of its simple inexpensive nature and because we use a natural force (the flow of air) to rotate the wheels whenever it is desired; thus we do not add parts that may cause mechanical failures, but we provide a valve means, an air supercharger if desired, and passageways through the wings or body of the airplane which will direct air to the wheels and exhaust the same away from the wheels and thereby place the wheels in motion before the airplane lands and thus release the ground friction on the tires.

We have illustrated some of the different forms of air vanes or fins which may be used in carrying out our invention in the drawings and it will be apparent that other forms may be used (not illustrated, but in the scope of this invention).

In the drawings forming part of the specification:

Figure 1:
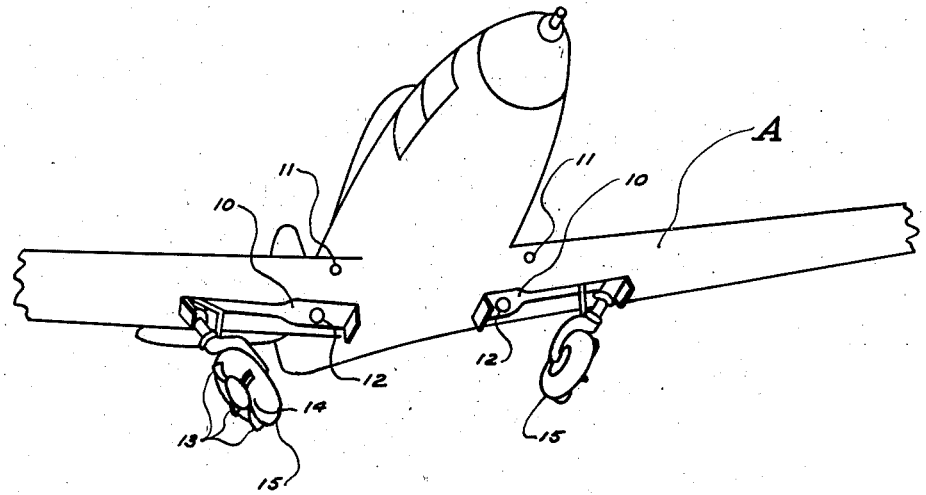
Figure 1 illustrates an airplane in flight showing one form of air vane which is molded on to the side walls of the tires.

In applying our invention to an airplane, it is a feature to adapt the same to any form of airplane.

In the drawings, we illustrate one type of airplane where the wheels are hinged in the wings and are adapted to be retracted into the recesses 10 in the bottom of the wings of the airplane.

In this form, we provide air inlets 11 and air outlets 12, which air passageways direct air to the air vanes 13. The air vanes 13, illustrated in Figures 1 and 2, are formed integral with the side wall 14 of the tire 15 on the landing wheels of the airplane.

Figure 2:
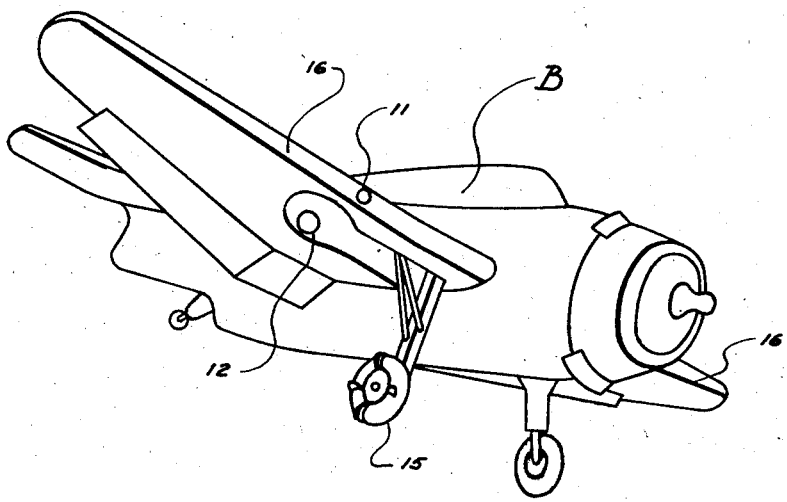
Figure 2 is a similar view showing a plane about to land and illustrating the air vanes on the side walls of the tires.

The airplane illustrated in Figure 2 is a different form of hinging the wheels of the plane where the air vanes would be in an upward position when the wheels are retracted into the wings 16 of the plane B. In the airplane A, the air vanes on the tires 15 project from the bottom side of the plane when the wheels are retracted.

An air inlet passage 11 leading to the chamber which receives the wheels 15, as illustrated, and an air exhaust passageway 12 is also illustrated.

Figure 3:
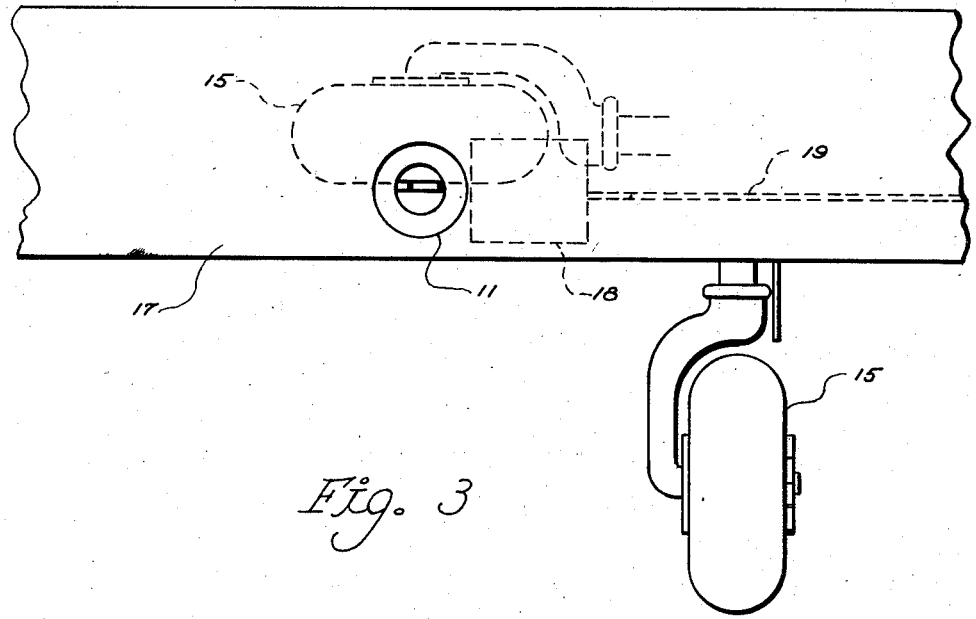
Figure 3 is a detail of an airplane landing wheel supporting means, showing the wheel in landing position in full lines, and in dotted lines showing the wheel retracted into the wing.

The wheel or tire 15 is illustrated in Figure 3 in landing position projecting from the bottom of the wing 17 of an airplane. This figure also illustrates in dotted outline the wheel in retracted position within the wing 17. The air inlet slots or openings 11 are illustrated in the forward edge of the wing 17. A shutter 18 for closing the air slots 11 is illustrated in dotted outline and a rod means 19 is illustrated in dotted outline, which is adapted to operate the shutter 18 to open and close the same. The air shutter 18, as well as the operating rod 19, are also illustrated in dotted outline in Figure 4.

It will be apparent that the air inlet passageway 11 in the wing 17 leads from the front edge of the wing to the wheel recess 10, and that an enlarged air exhaust passageway 12 is illustrated leading out of the back edge of the wing away from the tire 15. The air vanes for the wheel 15, illustrated in Figures 3 and 4, are formed on the hub cap or plate of the wheel 15 and are of the construction illustrated in Figure 7.

Figure 4:
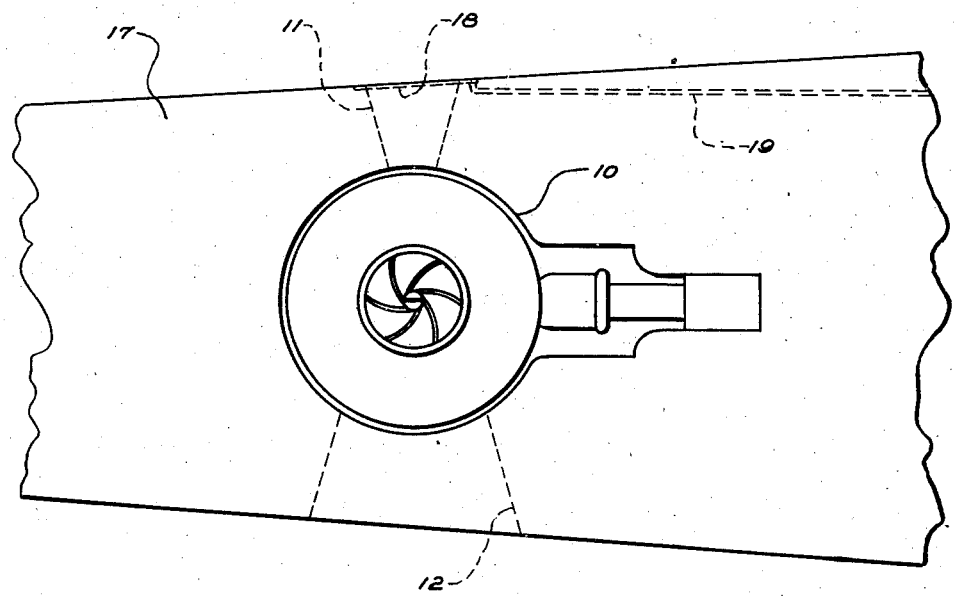
Figure 4 is a bottom view of Figure 3, showing the wheel retracted into the wing of the airplane.
Figure 7:
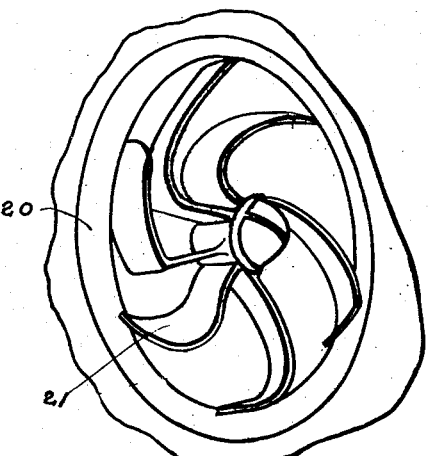
Figure 7 is a perspective of one form of air vane which may be attached to the hub of the wheel.

When the hub cap 20 is formed with the air vanes 21, as illustrated in Figure 7 and also in Figures 3 and 4, it will be apparent that the hub cap can readily be attached to any wheel of almost any airplane now in use. The hub cap 20 can be usually substituted for the old hub caps of the wheels and thus the wheels of any airplane can be readily converted from the old type to our form of wheel operating means.

Figure 5:
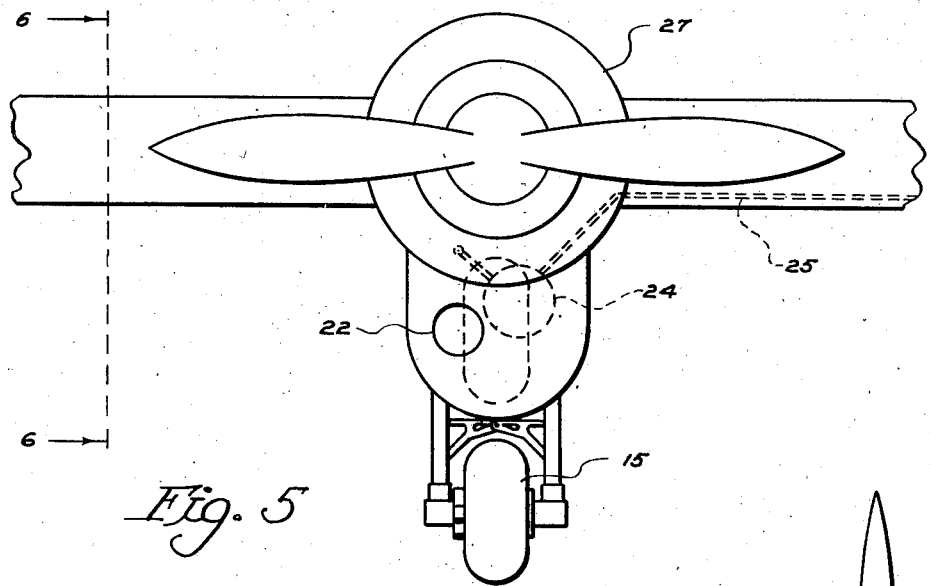
Figure 5 illustrates another form of supporting the wheel to the body of the airplane, showing a wheel in landing position in full lines, and in dotted position within the body when the wheel is retracted.
Figure 6:
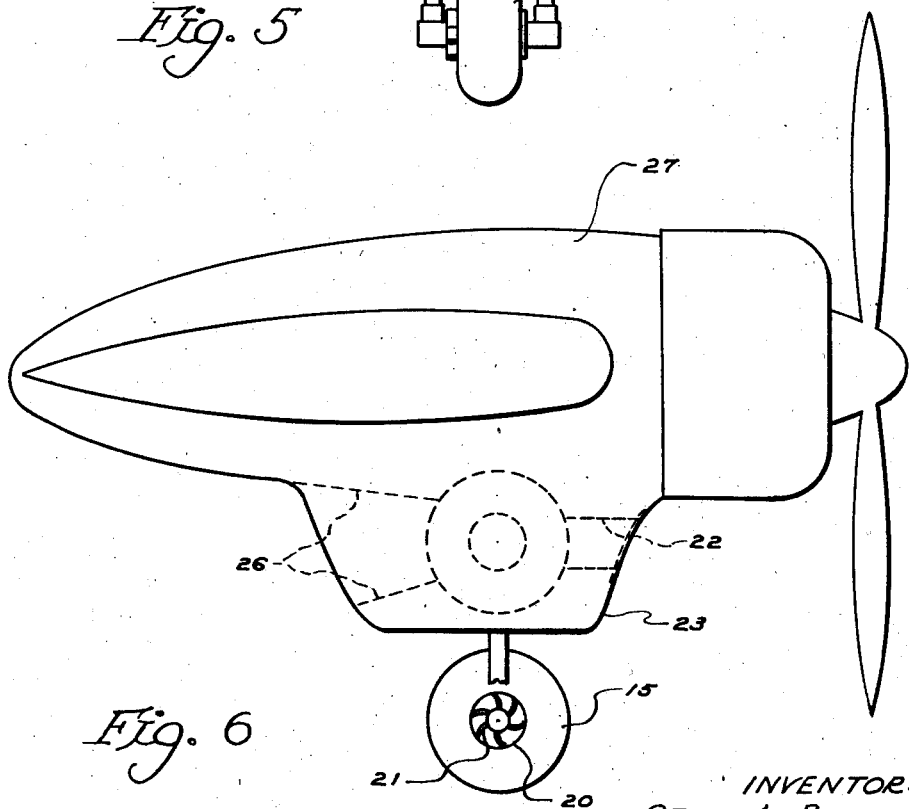
Figure 6 is a side elevation of Figure 5 on the line 6—6, showing the wheel in dotted formation when retracted and also showing the air inlet and outlet passageways which direct the air to and from the wheel.
Figure 10:
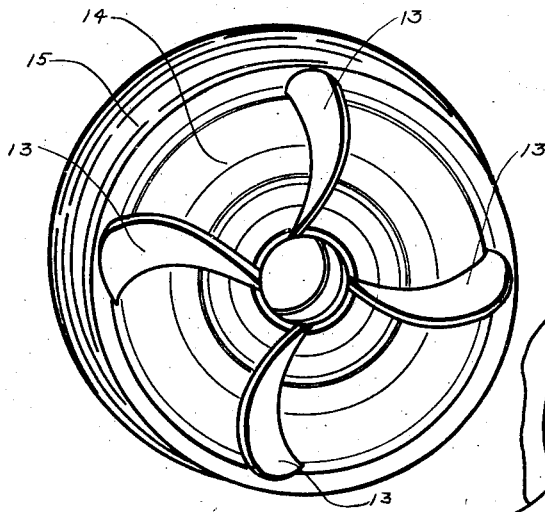
Figure 10 illustrates a tire showing the air vanes molded integral with the side walls.

It will also be apparent that our wheel operating means may be equally well applied to the wheels 15, which are retracted vertically into the body of the airplane, as illustrated in Figures 5 and 6. We have illustrated an air inlet passageway 22 formed in the leading edge of the body 23 of the airplane so that air may be directed to the wheel when retracted. The air passageway may be closed by the shutter 24 which is controlled by the airplane pilot through the operating rod 25. An air exhaust passageway 26 extends from the wheel recess in the body out of the back portion of the body.

Figures 4 and 5 illustrate the body of the airplane formed with wheel receiving housing projecting from the bottom of the motor housing 27. The cap 20 of the air vanes 21 is illustrated as being applied to the wheel 15 in Figures 5 and 6.

Figure 8:
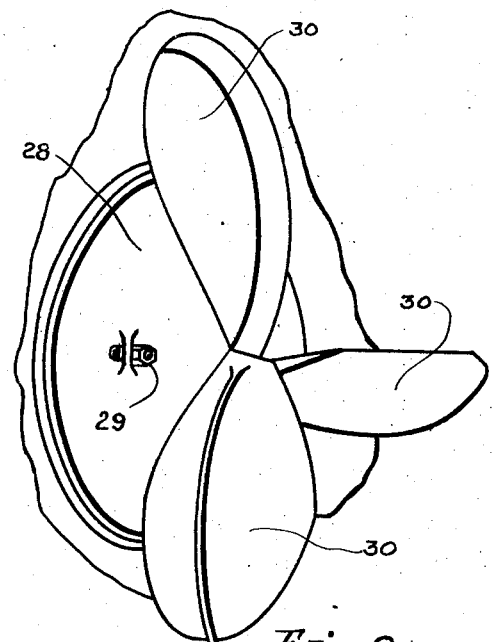
Figure 8 illustrates another form of air vane which may be attached to the hub of the wheel.

In Figure 8, we have illustrated the hub cap 28 which may be attached by the bolts 29 to the wheel of the airplane. In this form, the hub 28 is provided with a series of cup shaped air vanes 30 of the desired size and shape so as to provide air vanes for rotating the wheel of the airplane when it is desired.

Figure 9:
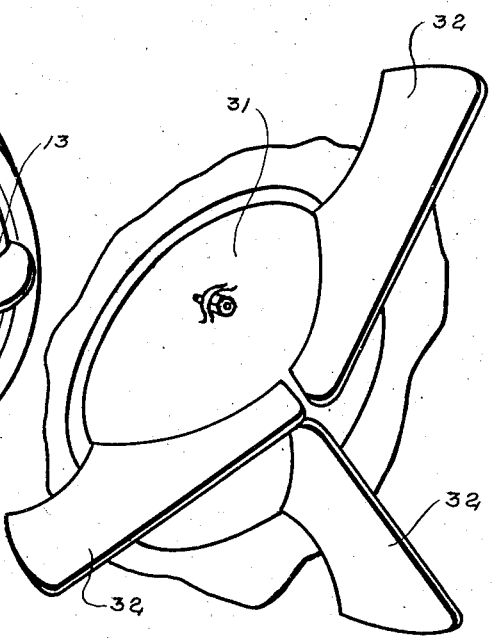
Figure 9 illustrates still another form of vane which may be attached to the hub of the wheel.

Still another form of hub cap 31 is illustrated in Figure 9 with air vanes 32 projecting from the outer surface of the cap 31.

The form, shape and design of air vanes may be optional in accordance with the size of the wheel to be rotated and it will be apparent that these forms will vary in accordance with the different types of airplanes and sizes of wheels. However, the primary object resides in providing a means of rotating the wheels of the airplane while the landing wheels are retracted into the body of the airplane so that the wheels may act as gyros to steady the operation of the ship or the wheels are set in motion, so that when the airplane lands on the ground, the landing wheels are rotated with sufficient speed to overcome to a very large degree the ground friction against the tires. We do not add any operative parts except the air shutter and, where it is desired, an air pump or air supercharger to direct air to the vanes on the wheels.

It is also apparent that the wheels may be lowered out of the body of the airplane and that the air fins formed on the tires can be of such formation and construction as to cause the air friction over the same to rotate the wheels so that the wheels may be set in motion after they have been dropped into landing position. It is also apparent that the wheels may be brought to rest at any time by means of the brakes now used on airplane wheels.

The features set forth for accomplishing the desired rotation of the wheels are of the simplest character providing an economical means for rotating the wheels and not requiring any mechanical parts which might fail to operate when needed. We use a natural air friction while the airplane is in flight to set the wheels into rotation and whether this is accomplished by one form of air vane means or another form is not material, excepting to accomplish and carry out the principles of our invention which reside in rotating the wheels to overcome ground friction in landing and to use the wheels without any additional means as gyros and providing a greater stability to the airplane in flight.

We claim:

1. Airplane wheels upon which an airplane is adapted to land, in combination with retracting means for lifting said wheels into the body of the airplane, air vanes radially extending from the axis of said wheels, air inlet and exhaust passageways leading to said vanes on said wheels formed in the airplane, a shutter for controlling said air inlet passageways, whereby the landing wheels of an airplane can be caused to rotate by a current of air passing over the same to minimize the frictional contact with the ground on the said wheels in landing the airplane.

2. Airplane wheels for landing and supporting an airplane in taking off, a combination with means for elevating and lowering said wheels and the body of the airplane, air inlet and exhaust passageways formed in the body of the airplane adapted to direct a current of air over said wheels, an air shutter for controlling the flow of air through said passageways, whereby said wheels can be rotated by air passing over the same to set said wheels in rotation before contacting the ground in landing the airplane.

O. A. BRANDT.
FLORENCE G. ELLINGSEN.

REFERENCES CITED

The following references are of record in the file of this patent:

UNITED STATES PATENTS

| Number | Name | Date |
| --- | --- | --- |
| 1,759,164 | Lyons | May 20, 1930 |
| 1,807,203 | Ehmig | May 26, 1931 |
| 1,833,019 | Faucher | Nov. 24, 1931 |
| 2,063,032 | Fator | Dec. 8, 1936 |
| 2,138,030 | Giovannoli | Nov. 29, 1938 |
| 2,305,237 | Carpenter | Dec. 15, 1942 |
| 2,307,316 | Juul | Feb. 27, 1945 |
| 2,312,159 | Gulotta | Feb. 23, 1943 |
| 2,333,447 | Schippel | Nov. 2, 1943 |
| 2,363,126 | Gibson | Nov. 21, 1944 |
| 2,389,525 | Manheim | Nov. 20, 1945 |

FOREIGN PATENTS

| Number | Country | Date |
| --- | --- | --- |
| 678,786 | France | Jan. 2, 1930 |